(12) United States Patent
Raguso

(10) Patent No.: US 9,325,672 B2
(45) Date of Patent: Apr. 26, 2016

(54) DIGITAL ENCRYPTION SHREDDER AND DOCUMENT CUBE REBUILDER

(71) Applicant: Cellco Partnership, Basking Ridge, NJ (US)

(72) Inventor: John Adrian Raguso, Bedminster, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 91 days.

(21) Appl. No.: 14/261,983

(22) Filed: Apr. 25, 2014

(65) Prior Publication Data

US 2015/0312222 A1    Oct. 29, 2015

(51) Int. Cl.
*H04L 29/06* (2006.01)
*H04L 29/08* (2006.01)
*G06F 21/62* (2013.01)

(52) U.S. Cl.
CPC ........ *H04L 63/0428* (2013.01); *G06F 21/6209* (2013.01); *G06F 21/6218* (2013.01); *H04L 67/1097* (2013.01); *H04L 2463/062* (2013.01)

(58) Field of Classification Search
CPC ............ H04L 63/0428; H04L 67/1097; H04L 63/061; H04L 2463/062; H04L 17/30477; G06F 17/30477; G06F 17/30312; G06F 21/6209; G06F 21/6218
See application file for complete search history.

(56) References Cited

U.S. PATENT DOCUMENTS

| | | | | |
|---|---|---|---|---|
| 8,037,319 B1* | 10/2011 | Clifford | .............. | G06F 21/6218 380/277 |
| 8,054,516 B2* | 11/2011 | Kuroda | ................ | G07D 7/2016 358/474 |
| 9,165,159 B1* | 10/2015 | McDonnell | ......... | G06F 21/6218 |
| 2004/0044959 A1* | 3/2004 | Shanmugasundaram | ................. | G06F 17/30923 715/227 |
| 2005/0002053 A1* | 1/2005 | Meador | ................ | H04N 1/4446 358/1.14 |
| 2006/0013080 A1* | 1/2006 | Shibata | ............... | G06F 21/6218 369/30.01 |
| 2006/0075228 A1* | 4/2006 | Black | .................. | H04L 63/0428 713/167 |
| 2006/0085594 A1* | 4/2006 | Roberson | ............ | G06F 11/1076 711/114 |
| 2006/0218113 A1* | 9/2006 | Kishi | ................ | G06F 17/30067 |
| 2008/0112559 A1* | 5/2008 | Dyne | ....................... | G09C 1/02 380/28 |
| 2008/0236904 A1* | 10/2008 | Zukowski | ............. | G06F 17/241 178/18.03 |
| 2008/0244385 A1* | 10/2008 | Zukowski | ............. | G06F 17/241 715/255 |
| 2009/0019279 A1* | 1/2009 | Kato | ....................... | H04L 9/085 713/150 |
| 2009/0235303 A1* | 9/2009 | Yamaoka | ................ | G06Q 30/02 725/31 |
| 2010/0008509 A1* | 1/2010 | Matsushita | ............. | H04L 9/083 380/279 |
| 2010/0287171 A1* | 11/2010 | Schneider | ......... | G06F 17/30949 707/759 |
| 2011/0007970 A1* | 1/2011 | Saund | ................ | G06K 9/00449 382/176 |
| 2012/0287456 A1* | 11/2012 | Innami | ............... | H04N 1/00482 358/1.13 |
| 2012/0311318 A1* | 12/2012 | Kuno | .................. | H04L 63/0428 713/150 |
| 2014/0089683 A1* | 3/2014 | Miller | .................... | H04L 63/061 713/193 |

\* cited by examiner

*Primary Examiner* — Joseph P Hirl
*Assistant Examiner* — J. Brant Murphy

(57) ABSTRACT

A method of storing a document includes converting the document into a table of symbols and shredding the table into a plurality of randomly selected strips of symbols. The method further includes randomly selecting a plurality of storage locations and storing the strips of data in the plurality of locations. The method generates a key including pointers to the plurality of locations and encrypts the key.

20 Claims, 9 Drawing Sheets

| Document VZW_R&D. Doc | Tag Alias | Location | Beginning Placement | Number of digits | Ending Placement |
|---|---|---|---|---|---|
| VZW_R&D. Doc_1 | 1Y7H822557 | 152.999.666.10 | L7 | 25 | L32 |
| VZW_R&D. Doc_2 | 89HWNG478 | 154.999.666.10 | G3 | 7 | G10 |
| VZW_R&D. Doc_3 | GE567A29L | 152.343.666.10 | K11 | 11 | A11 |
| VZW_R&D. Doc_4 | G3J9 | 152.999.866.10 | A1 | 3 | C3 |
| VZW_R&D. Doc_5 | 11KALLLOOFEE | 152.999.676.10 | Z2 | 8 | Z10 |

FIG. 5A

DIGITAL ENCRYPTION SHREDDER AND DOCUMENT CUBE REBUILDER

BACKGROUND

With the onset of public use of the Internet® and the World Wide Web, secure handling of sensitive data has become an important issue. Unauthorized users or hackers, have become very sophisticated in their techniques for accessing sensitive data. It is more and more common for the hackers to steal and use for illegal purposes, private information such as social security numbers, driver's license numbers, calling card numbers, bank account numbers, and credit card numbers. At the same time, users are increasingly demanding that data be both mobile and secure. Although networks, such as the Internet, can transmit data from one computer to another, users often must identify and transmit the data they need to the proper destination by providing some form of identification information which is also prone to attack from hackers. The data is also often routed through, and stored in, unsecure servers or network devices which can be intercepted and further compromise security.

Therefore, there is a need for more secure delivery and storage of sensitive data.

BRIEF DESCRIPTION OF THE DRAWINGS

FIG. 5A is an exemplary data diagram of a mapping key according to one or more implementations described herein.

DETAILED DESCRIPTION OF PREFERRED EMBODIMENTS

Figure 1:
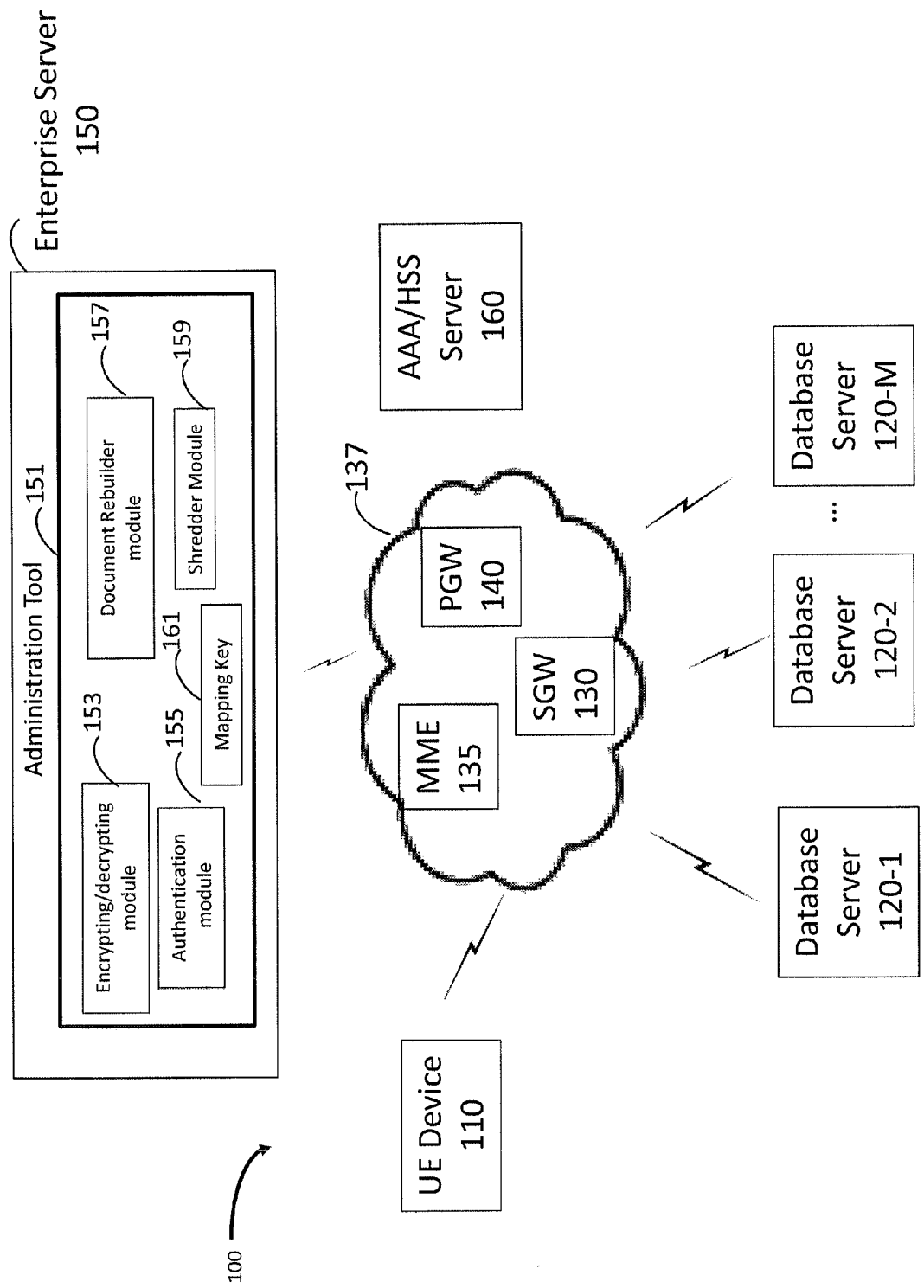
FIG. 1 is a diagram of an example environment in which systems and/or methods described herein may be implemented.

The following detailed description refers to the accompanying drawings. The same labels and/or reference numbers in different drawings may identify the same or similar elements. Also, the following detailed description does not limit the invention.

In one or more implementations, devices may be used to control the storage, retrieval and delivery of documents to user equipment (UE) devices in a wireless network.

In the materials that follow, the term "wireless node," is intended to be broadly interpreted to include a device that wirelessly communicates with a user device (e.g., user equipment (UE)). By way of example, but not limited thereto, a wireless node may correspond to an evolved Node B (eNB), a base station (BS), a base station controller (BSC), a Node B, a base transceiver station (BTS), a relay node, a repeater, a home eNB, a radio node, or a UE-gateway (UE-GW). The wireless node may support one access and/or wireless technology or multiple access and/or wireless technologies.

The term "delivery of a document," or "document delivery" as used herein, is to be broadly interpreted to include data flow from a user device to a server (e.g., an enterprise server) and from the server to multiple database servers. The document delivery comprises delivery of compressed or uncompressed text files, spreadsheet files, presentation files, portable document files, audio files, video files, programming files, etc.

By way of example, but not limited thereto, within a Long Term Evolution (LTE) network, delivery of a document may permit data to flow from one user device to a server or a group of servers through one or more wireless nodes (e.g., one or more eNBs) to serving the devices without traversing higher layers of the LTE network (e.g., a serving gateway (SGW) or a packet data network (PDN) gateway (PGW)). However, it will be appreciated that delivery of a document may be applicable to networks other than LTE. In this regard, the term "network," as used herein, is intended to be broadly interpreted to include a wired or wireless network (e.g., an Ethernet network, a mobile network, a cellular network, a non-cellular network, etc.). By way of example, but not limited thereto, delivery of document may be performed in a variety of network types, such as, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, an Evolution Data Optimized (EV-DO) network, and/or another type of wireless network (e.g., an ad hoc network, etc.), or some other type of wired network.

Depending on the type of network, document delivery may be performed by wireless nodes not specifically described herein that provide corresponding functionality. By way of example, but not limited thereto, delivery of document may be performed by a BS, a BSC, an eNB, a network access device, a serving GPRS support node (SGSN), etc.

In an exemplary implementation, normal communication (e.g., a request for retrieval a document from a UE device) may proceed over an evolved packet core (EPC). For example, a UE device may communicate with an enterprise server via an eNB, an SGW and a PGW to send a request to retrieve a document. Upon retrieval, the server may then send the document back to the UE device through the PGW, SGW and eNB. In another example, devices may communicate with servers in different operator networks, and a data flow may traverse the eNBs, SGWs and PGWs (or equivalents) of the different networks.

The enterprise server may further communicate (e.g., for the storage of the document) with different database servers that are within the same network or in different networks. The communication between the database server and the enterprise server may take place via the EPC network or, in one example, the enterprise server may communicate with the database servers directly, bypassing the EPC network.

FIG. 1 is a diagram showing an overview of an example implementation. As shown in FIG. 1, a network environment 100 may include UE devices 110 (referred to collectively herein as UE devices 110 and individually as UE device 110). In the example, the UE devices 110 obtain content from the enterprise server 150 over-the-air via a number of base stations (not shown). The example network also includes a Service Gateway (SGW) 130 that is configured to communicate packet data with the UE devices 110 via the base stations, a packet data network gateway (PGW) 140 that provides an interface between the SGW and/or a global information network (e.g. the Internet®). The example network also includes a mobility management entity (MME) device 135 that is coupled to home subscriber service (HSS), authentication, authorization and accounting (AAA) server 160 to provide user profiles, authorization, authentication and accounting services for the data streams accessed by the UE devices 110. An enterprise server 150 controls the delivery of document from the database servers 120-1, 120-2, 120-3, . . . , 120-M (where M>1) (referred to collectively herein as database servers 120 and individually as database server 120) to the UE devices 110 by controlling how and where the document, or different portions of the document are stored and retrieved, as described below. The number of devices and/or networks, illustrated in FIG. 1, is provided for explanatory purposes only. In practice, there may be additional devices and/or networks, fewer devices and/or networks, different devices and/or networks, or differently arranged devices and/or networks than illustrated in FIG. 1.

A common method for storing sensitive data (e.g., different kinds of documents, some of which may include sensitive personal information such as credit card information) involves encrypting the data and storing it in a database. Thus, data regarding a particular entity, such as a customer, is stored in common facilities. To access the data, a hacker need only figure out how to electronically break in to the facility and how to decrypt the data. The hacker would then have enough information to be able to make fraudulent use of the data. For example, if a hacker broke into a telecommunications provider's database and managed to obtain a customer's identity and card number, the hacker might be able to fraudulently make thousands of dollars of purchases using the information.

The examples described below provide systems and methods for securely delivering and storing data (e.g., data of a document). For example, one of the methods may include randomly or pseudo-randomly shredding the data and storing the shredded data in randomly selected database servers. In one example, a key (e.g., a mapping key) may be generated that keeps track of the shredded data. The key may be encrypted for further security. The data may be recovered by decrypting the key and piecing together the shredded data, based on the key. In addition to generating an encrypted key, the method may also generate a unique identifier for the document and provide the identifier to the user. This identifier may then be used to access the document.

Network environment 100 may include an evolved packet system (EPS) that includes a LTE network and/or an evolved packet core (EPC) 137 that operates based on a third generation partnership project (3GPP) wireless communication standard. The LTE network may be a RAN that includes one or more small base stations that take the form of eNBs. The EPC 137 may include SGW 130, MME 135, and/or PGW 140 that enable UE devices 110 to communicate with enterprise server 150, using unicast/multicast transmissions, and/or an Internet protocol (IP) multimedia subsystem (IMS) core (not shown). In another example network 137 may be a local area network (LAN) or a wide area network (WAN).

With reference again to FIG. 1, UE device 110 may include any computation or communication device, such as a wireless mobile communication device that is capable of communicating with base station and/or a server (e.g., enterprise server 150). Examples of the UE device 110 include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of wired or wireless mobile communication device or computation device. UE device 110 may send traffic to and/or receive traffic from enterprise server 150. The UE devices are programmed with applications (Apps) that access content from the network. An example UE device 110 may have multiple Apps running at a given time and, thus, may access multiple documents at the same time using the techniques described below.

SGW 130 may include one or more computation or communication devices that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 130 may aggregate traffic received from one or more base stations associated with the LTE network, and may send the aggregated traffic to the enterprise server 150 (e.g., via PGW 140) and/or other network devices associated with the EPC. SGW 130 may also receive traffic from the other network devices and/or may send the received traffic to UE device 110 via base station. SGW 130 may perform operations associated with handing-off UE devices 110 from and/or to other base stations in the LTE network.

MME 135 may include one or more computation or communication devices that gather, process, search, store, and/or provide information in a manner described herein. For example, MME 135 may perform operations associated with handing off UE device 110, from one base station to another. The MME may also interface with the AAA/HSS server 160 to provide authentication, authorization and accounting services for the network 137.

PGW 140 may include one or more computation or communication devices that gather, process, search, store, and/or provide information in a manner described herein. PGW 140 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 140 may include a device that aggregates traffic received from one or more SGWs, and may send the aggregated traffic to enterprise server 150, to other network devices. In another example implementation, PGW 140 may receive traffic from enterprise server 150, database servers 120 and may send the traffic toward one of the UE devices 110 via SGW 130.

Enterprise server 150 may include one or more devices that gather, process, search, store, and/or provide document in a manner similar to that described herein. For example, administration tool 151 of the enterprise server 150 may process various functions related to the document by interacting with the other components of the enterprise server and/or invoking different modules within the administration tool. For example, administration tool 151 may communicate with a network interface (e.g., communication interface 260) of the enterprise server to facilitate the receiving and sending of documents to and from the enterprise server. Moreover, in some implementations, the administration tool 151 may invoke: authentication module 155 to authenticate a UE device 110, shredder module 159 to perform functions related to shredding a document into strips of data symbols, encrypting/decrypting module 153 for encrypting a key related to the strips of data symbols and a document rebuilder module 157 for rebuilding the shredded document. The administration tool 151 may further communicate with the network interface to store the strips of data symbols in the database servers 120. The administration tool, in one example, may generate the key (e.g., mapping key 161) related to the document.

In one implementation, the administration tool 151 is an application that is uploaded in the enterprise server 150 by an enterprise administrator. In another example, the administration tool may be provided by a network administrator.

As described herein, the authentication module 155 may authenticate a sender of a document. Any type of authentication may be used. For example, the authentication module 155 may obtain authentication information from AAA server 160 that is part of the network 100. The authentication module 155 may in addition or instead seek information from the UE device 110, such as information that may be present in a SIM card (e.g., International Mobile Equipment Identity (IMEI) number) within the UE device and/or a user name and password or biometric information. The authentication module 155 may use this information to confirm the identity of the user to ensure that the user is allowed to access the enterprise server 150. As described below in greater detail (see FIG. 3), the authentication module 155 may also perform multiple levels of validation for the UE device 110 and the user by validating information related to the UE device (e.g., mobile device number and the password to authenticate the user).

If the authentication effort fails, the authentication module 155 may be configured to send a message back to the UE device. This message may or may not notify the UE device 110 and the enterprise administrator that authentication has failed. In this case, any further communication between the UE device 110 and the enterprise server 150 may be halted.

If authentication is successful, on the other hand, the example administration tool 151 is configured to cause the network interface of the enterprise server to facilitate the reception of a document from the UE device 110.

In one example, the administration tool 151 further facilitates the storage of the received document. The administration tool 151 shreds a converted format (e.g., a binary format) of the document into randomly or pseudo-randomly selected strips of binary data. Administration tool 151 further randomly or pseudo-randomly selects from among multiple database servers for storing the strips of binary data. The administration tool also generates a mapping key to help locate the strips of data during a retrieval process. Described below are the details of the above mentioned processes performed by the administration tool in the enterprise server.

Figure 5B:
FIG. 5B is an exemplary data diagram of tags according to one or more implementations described herein.

In one implementation, prior to shredding the document, the administration tool may convert the received document into a table of symbols and/or characters. In one example, the table may be a table of symbol data as shown in FIG. 5D. The symbol table corresponding to the document may represent the document as a sequence of symbols, for example. The shredder module 159 of the administration tool is then invoked to shred the symbol table. The administration tool implements the shredding module 159 for converting the document into strips of symbol data. In one example, shredder module implements one or more pseudo-random number generators or random sequencers (not shown) to randomly select different strips of symbol data from the symbol table. In one embodiment, the table of symbol data may include credit card information such as credit numbers and their corresponding identifiers (e.g., names and addresses, etc., of the credit card holders). For example, table 540 shows a portion of such a table of symbol data. In one example, a randomly selected strip of symbols may be a diagonal section 543 that includes symbols "JE5". In another example, a randomly selected strip of symbol may be a vertical column 545 that includes symbols "YEH50", or a horizontal row 547 including characters "SM". As illustrated, the selected strips may have varied lengths (i.e., the number of the symbols in the selected strip) that include different symbols.

For the sake of brevity, the examples that are discussed in this application, relate to symbols that are binary digits (e.g., 0101 etc.). However, it is understood that symbols may be any characters other than binary digits. As used herein, the term "random" or "randomly" includes both pseudo-random and random.

For example, the shredder module may randomly select horizontal rows, vertical columns and diagonal sections from the symbol table. The length of each of these segments may also be randomly selected. The shredder module may also record a starting position and an ending position (i.e., a sequence) of a random strip of data during the selection process. In addition, the shredder module may also record the number of digits (e.g., symbol counts) within the random strips of data. It may then pass the sequence information and the symbol counts to a data processing module (not shown) within the administration tool or to a processor (e.g., processing unit 220) of the enterprise server for further processing. As used herein, the term "random" or "randomly" includes both pseudo-random and random.

In one implementation, the administration tool may further pseudo-randomly or randomly select from among multiple database servers to store the random strips of symbol data. In such an implementation, the administration tool may invoke again the random sequencer to randomly select the database servers and to randomly select storage locations within the servers. During the selection process the administration tool may record the locations and the database servers (e.g., the IP addresses of the servers and pointers to starting and ending cells occupied by the symbol sequence).

In one example, a database server 120 may be configured to store the random strips of data of a document in randomly selected locations in different database tables. Alternatively, in another example, a single database table may store multiple random strips of data that correspond to multiple documents. The database servers may be solely dedicated to the storage of the strips of data which may expedite the process of storage and retrieval of the strips of data. This may further enhance the security of the strips of data by ensuring that the strips of data do not get corrupted with other information that may possibly be stored in the database. In one example, the database tables may be selected randomly. In such an implementation, the administration tool may invoke the random sequencer to randomly select the database tables in the selected servers.

The enterprise server 150 may communicate with the database servers 120 through network 137 via the network interface (e.g., communication interface 260). In another implementation, the enterprise server 150 may communicate directly with the database servers bypassing network 137.

The administration tool 151 may further select different place holders for storing the random strips of data within a database table of a selected database server. As used herein, the term "place holder" indicates a contiguous set of data locations within a storage element, for example, a disk drive, memory or database of a particular database server. In one example, the place holder may be designated by a starting location and an ending location in the memory of the server. A place holder may also be the identity of a database and pointers to starting and ending records of the database. In another alternative, a place holder may be starting and ending locations on a disk drive, where each location includes a sector of a disk drive and an offset into the sector. In one example, the place holders may be randomly selected in direction and length in the selected database table of a destination database server. In such implementation, the administration tool may check with other locations in the selected database table (e.g., for availability), prior to the storage of the data, to ensure there is no overlapping of data in the selected database table.

The administration tool 151 may compare the sequence of a strip of data (i.e., the sequence randomly selected by the shredder module) with available place holders of the database table to determine if there is an empty place holder that has a sufficient number of storage locations to hold the sequence. The administration tool may perform multiple comparisons of random strips of data with multiple database tables to select placeholders. This allows the administration tool 151 to avoid selecting an already-occupied location such that the document data is stored only among those locations not currently being used.

The administration tool may be further configured to generate a mapping key 161 based on different parameters such as: the sequences of the random strips of symbol data, locations where the random strips of symbol data are stored, etc. Mapping key 161 may be stored in the memory of the enterprise server, for example. Mapping key may also be stored in a database (not shown) of the enterprise server. An example of a mapping key is described with reference to FIG. 5A. Mapping key 161 may include information related to the storage of the document. In one implementation, the mapping key may be in a table format with rows and columns as shown in FIG. 5A. In this example, the symbols are binary bits and the mapping key 161 includes the document name 501 along with the identifiers for the randomly generated strips of binary data (502, 504, 506, 513 and 508) that are generated by the shredder module 159. As shown in column 505, mapping key further stores the location information (e.g., the IP addresses and location information at the IP addresses) of the corresponding strips of data. Data identifying where sequences are stored may also be included in the mapping key. Columns 507 and 511 respectively indicate the starting positions and the ending positions of the strips (e.g., the positions of the place holders in a database table). The key also stores number of digits contained in the random strips, as indicated by column 509. For example, strip 513 may have a sequence of A1 to C3 that contains 3 bits. As is clear, strip 513 is stored diagonally in its table (unlike other strips, such as strip 502, which is stored in its table horizontally). Moreover, random strip 513 may be stored in database server (e.g., database server 120-1) that has an IP address of 152.999.866.10 (indicated by 512). In this example, the values "A1" and "C3" represent pointers into data storage on the database server 120-1 that mark the starting and ending locations in which the 3 bits of the strip 513 are stored.

Figure 5C:
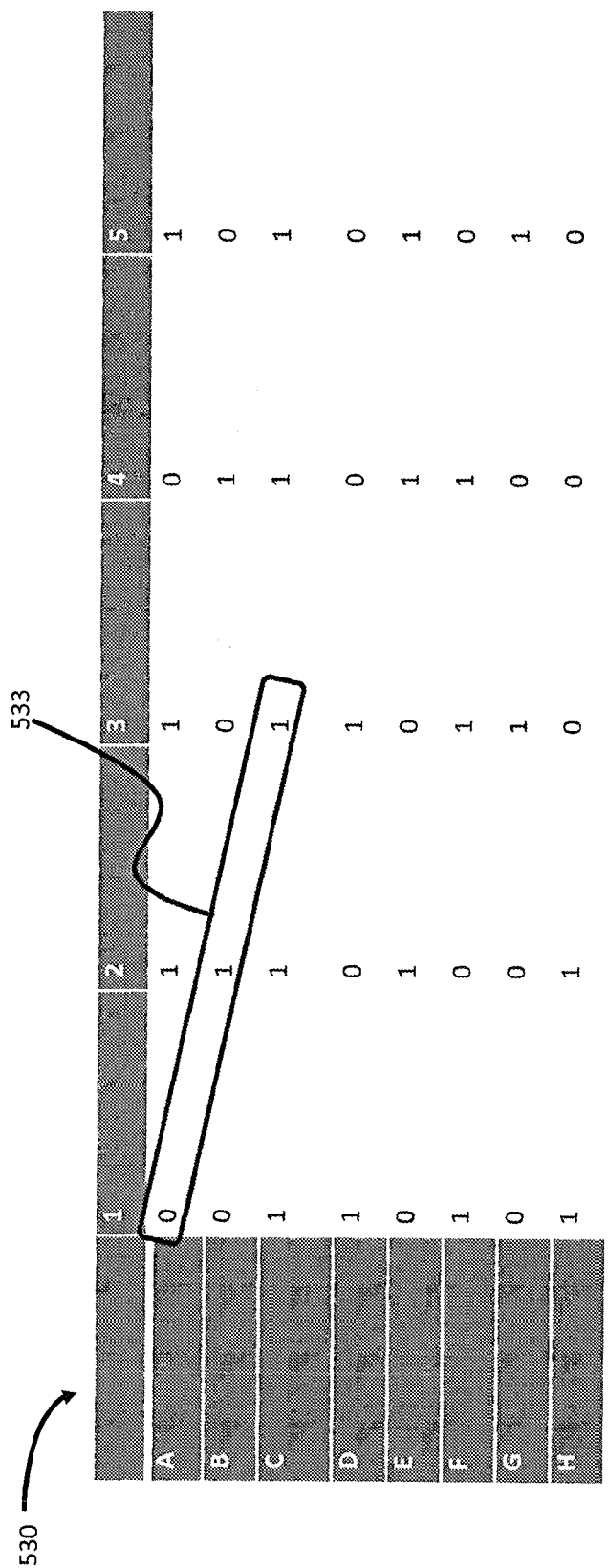
FIG. 5C is an exemplary data diagram of a portion of a database table in a database server according to one or more implementations described herein.
Figure 5D:
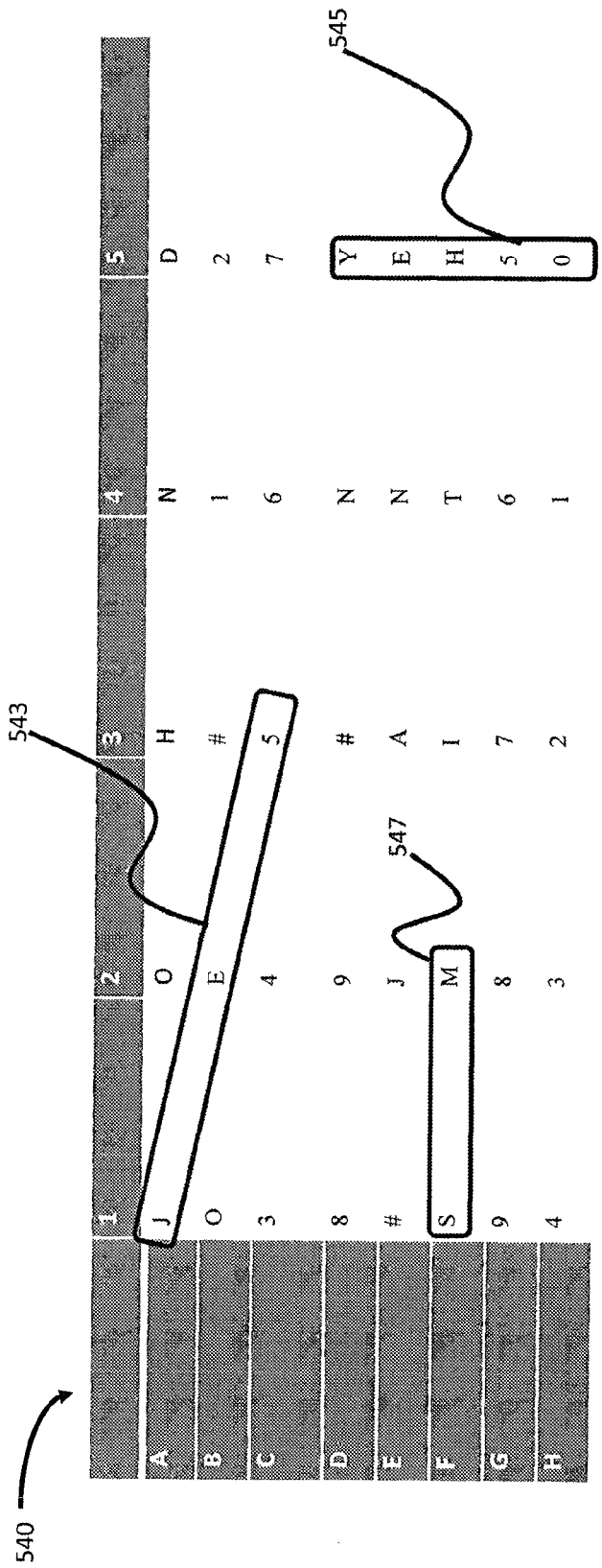
FIG. 5D is an exemplary data diagram of a portion of a table of symbol data according to one or more implementations described herein.

An example of storage of the strip 513 is shown with reference to FIG. 5C. 530 illustrates a portion of a database table that stores the data strip 513 in the placeholder 533. For example, placeholder 533 has a sequence of A1 to C3. The database table may be stored in the database server 120-1 with IP address 512, as discussed earlier. The other sections of the database table 530 may represent place holders for other strips of data.

In addition, the mapping key may further include tag aliases 503, as described below.

In one implementation, the administration tool 151 may be configured to tag the randomly generated strips of binary data. In these implementations, as shown in column 503 of key 161, tag aliases may be generated randomly, by the random sequence generator. As illustrated in FIG. 5A, tag alias 514 corresponds to the strip 513. In one implementation, as shown in FIG. 5B, random strips of binary data may be tagged with the tag aliases and stored in a table 520. For example, as shown by row 523, strip 513 (with data 011) is tagged with tag alias 514. Table 520 may be stored in the enterprise server, in one example. Strip 513 may also be tagged with its corresponding location, for example. In such an example, a retrieval process of the strip may use only the tag alias as the query parameter, as described with reference to FIG. 4.

In another implementation, the administration tool 151 may be configured to encrypt the mapping key. Various encryption techniques and methods known in the art, for example, an asymmetric algorithm such as pretty good privacy (PGP), a block cipher such as data encryption standard (DES) or triple DES, advanced encryption standard (AES), Feistel cipher, elliptic curve cryptography, or a substitute cipher, as shown in FIG. 6A, etc., may be used for encryption and decryption of the mapping key.

In one example, the administration tool may invoke the encrypting/decrypting module 153 to carry out such operations to further secure the key. The encrypted key may then be stored within enterprise server 150. In addition, the tag aliases may be encrypted by the encrypting/decrypting module 153 within the mapping key, for example.

Figures 6A, 6B, 6C:
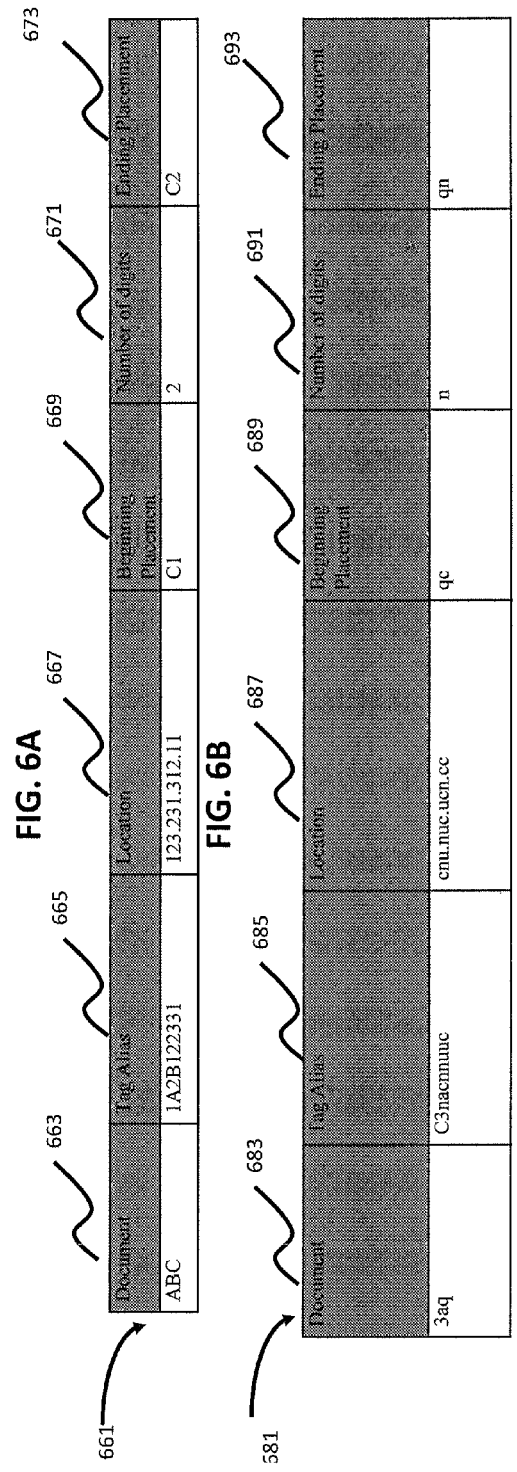
FIG. 6A is an exemplary data diagram of a cipher according to one or more implementations described herein.
FIG. 6B is another exemplary data diagram of another key according to one or more implementations described herein.
FIG. 6C is an exemplary data diagram of an encrypted mapping key according to one or more implementations described herein.

With reference to FIGS. 6A-C, an example of an encryption is shown. In this example, a mapping key 661 is shown in FIG. 6B and the corresponding encrypted key 681 is shown in FIG. 6C. A substitution cipher 610, as shown in FIG. 6A, may be used to encrypt the key 661. Cipher 610 may be randomly generated by the administration tool, in one example. A simple illustration of the encryption using the cipher is provided here. As shown in FIG. 6B, document 663 (or a strip of a larger document) has a sequence of C1 to C2. That is, the beginning position 669 is designated by "C1."

According to the cipher 610, character 'C' corresponds to 'q' (611 of FIG. 6A). Moreover, character '1' corresponds to 'C' (612 of FIG. 6A). As such, in the encrypted key 681, the encrypted beginning position 689 is 'qc'.

That is, 'qc' corresponds to sample key 661's beginning position 'C1' (669) based on the cipher facilitating the encryption.

In similar fashion, other information (e.g., location 667, tag alias 665, number of digits 671 and ending placement 673) may be encrypted using the cipher 610 to produce their corresponding encrypted versions (e.g., location 687, tag alias 685, number of digits 691 and ending placement 693).

In other implementations, cipher 610 may be used in different ways to encrypt the sample key 661. For example, at least two characters (or digits) in the table may be used simultaneously for encryption. In such an example, C1=b, 1A=5, 2B=e, 12=0, 23=v and 31=7. As such, the encrypted tag alias 685 would be '5e0v7' and, the encrypted beginning placement 689 would be 'b'.

In another example, a single column (e.g., column A) of cipher 610 may be used for encryption. In that example, A corresponds to '3', B corresponds to '2', 3 corresponds to 'g', etc.

It is contemplated that, different ciphers may be implemented for encryption of the different columns (e.g., columns 663-673) of the same key (e.g., key 661). For example, a block cipher may be used to encrypt column 663, on the other hand, a substitution cipher may be used to encrypt column 665. In addition, the selection of the ciphers for different columns may be performed periodically or randomly. Corresponding ciphers 610 may be used in the decryption process based on the various ways it was implemented in the encryption process (as described above).

After storing the document and generating and encrypting the key, the administration tool 151 may generate a unique identifier for the encrypted key and provide that identifier to the user. This identifier may be provided to the administration tool by the user to access the key and, thus, initiate the retrieval process of the document, as described below with reference to FIG. 4 (e.g., see blocks 415 and 420).

Rebuilding the document upon retrieval of the strips of data is described in detail with reference to FIG. 4. The rebuilding process may include the administration tool performing various functions, such as, authenticating the UE device, receiving a request for locating the stored document, decryption of the key related to the document and retrieving the strips of data from the different database servers.

The administration tool 151, during the retrieval process, may authenticate the user and/or the UE device. Similar to the authentication process during the storage of the document 501, the administration tool may invoke the authentication module 155 to perform such authentication function. Upon successful authentication, the administration tool 151 may be further configured to receive requests from the UE device 110 to retrieve the stored document 501. The request includes a document identifier which the administration tool uses to locate the mapping key 161. The administration tool 151 may invoke the encrypting/decrypting tool 153 to decrypt the mapping key 161.

If the encrypting/decrypting tool 153 successfully decrypts the stored mapping key, the administration tool then proceeds to locate and fetch the random strips of symbol data. The administration tool may perform queries based on the location addresses 505 and sequence information (507 and 511) of the random strips of data. Alternatively, administration tool may use the tag aliases 503, stored in table 520 to query and locate the random strips of symbol data (e.g., 502, 504, 506, 508 and 513).

Upon retrieving the strips corresponding to the document 501, the administration tool 151 may invoke document rebuilder module 157 to reassemble the strips of symbol data. The rebuilder module 157 may keep a count of the number of strips during the storage process of the document. As such, during the rebuilding process, if the number of retrieved strips matches the number of the stored strips, rebuilder module 157 may perform the task of rebuilding. Upon successfully rebuilding the document, rebuilder module 157 may send a notification to the administration tool that the document has been successfully rebuilt. The administration tool 151 may then further communicate with the UE device 110 and provide the requested document.

HSS/AAA server 160 may include one or more devices that gather, process, search, store, and/or provide information in a manner described herein. For example, HSS/AAA server 160 may manage, update, and/or store, in a memory associated with HSS/AAA server 160, profile information, associated with UE device 110, that identifies applications and/or services that are permitted for and/or accessible by UE device 110; information associated with a user of UE device 110 (e.g., biometric data, a username, a password, a personal identification number (PIN), etc.); rate information; minutes allowed; and/or other information. Additionally, or alternatively, HSS/AAA server 160 may perform authentication, authorization, and/or accounting (AAA) operations associated with a communication session with UE device 110. MME 135 may receive authorization from HSS/AAA server 160, in response to a request from UE device 110, before MME 130 creates and stores a context for UE device 110.

Figure 2:
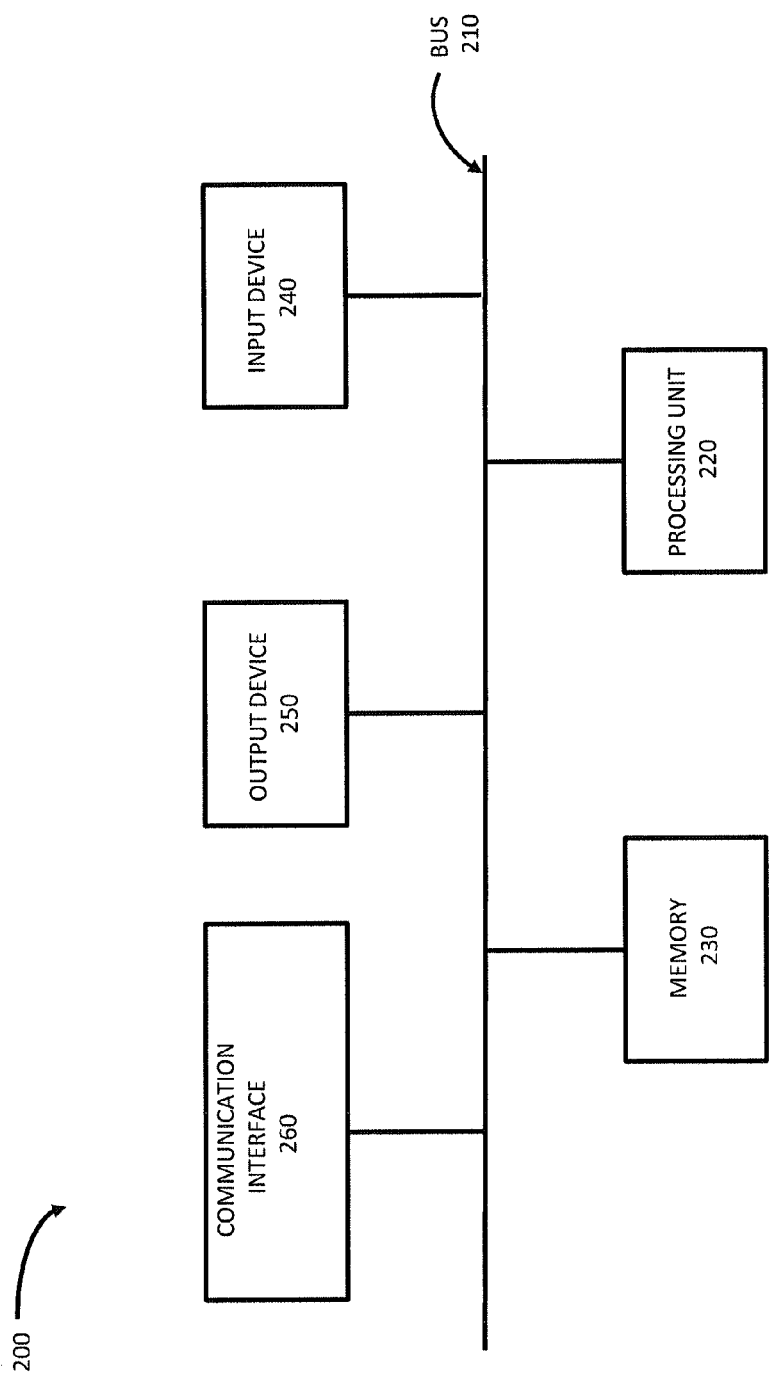
FIG. 2 is a block diagram of example components of a device that may be utilized in the environment of FIG. 1.

FIG. 2 is a diagram of example components of a device 200 according to one or more implementations described herein. In certain implementations, a portion or all of device 200 may correspond to one or more of the devices depicted in FIG. 1. For example, device 200 may correspond to UE device 110, SGW 130, MME 135, PGW 140, database server 120, AAA/HSS 160 or enterprise server 150. Additionally, each of UE device 110, SGW 130, PGW 140, database server 120 or enterprise server 150, may include one or more devices 200 or one or more components of device 200 and multiple ones of the SGW 130, PGW 140, database server 120 or enterprise server 150 may be implemented in a single one of the devices 200.

As depicted, device 200 may include bus 210, processor 220, memory 230, input device 240, output device 250 and communication interface 260. In other implementations, device 200 may include fewer components, additional components, different components, or differently arranged components than those illustrated in FIG. 2.

Bus 210 may include one or more component subsystems and/or communication paths that enable communication among the components of device 200. Processor 220 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 220 may control the overall operation, or a portion thereof, of device 200, based on, for example, an operating system, and/or various applications. Processor 220 may access instructions from memory 230, from other components of device 200, or from a source external to device 200 (e.g., a network or another device).

Memory 230 may include memory and/or secondary storage. For example, memory 230 may include random access memory (RAM), dynamic RAM (DRAM), read-only memory (ROM), programmable ROM (PROM), flash memory, or some other type of memory. Memory 230 may include a hard disk (e.g., a magnetic disk, an optical disk, a magneto-optic disk, a solid state disk, etc.) or some other type of computer-readable medium, along with a corresponding drive. The memory 230 may include computer-readable medium, defined as a non-transitory memory device. A memory device may include space within a single physical memory device or be spread across multiple physical memory devices.

Input device 240 may include one or more components that permit a user to input information into device 200. For example, input device 240 may include a touch-screen, keypad, a button, a switch, a knob, a fingerprint recognition device, an iris or retinal scan device, a web cam, voice recognition logic, a touchpad, an input port, a microphone, a display, or some other type of input component. Output device 250 may include one or more components that permit device 200 to output information to a user. For example, output device 250 may include a display, light-emitting diodes (LEDs), an output port, a speaker, or some other type of output component.

Communication interface 260 may include one or more components that permit device 200 to communicate with other devices or networks. For example, communication interface 260 may include an optical, wireless or wired interface. Communication interface 230 may also include an antenna (or a set of antennas) that permit wireless communication, such as the transmission and reception of radio frequency (RF) signals in accordance with the applicable standard for wireless communications with base stations.

As described herein, device 200 may perform certain operations in response to processor 220 executing software instructions contained in a computer-readable medium, such as memory 230. The software instructions may be read into memory 230 from another computer-readable medium or from another device via communication interface 260. The software instructions contained in memory 230 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 3:
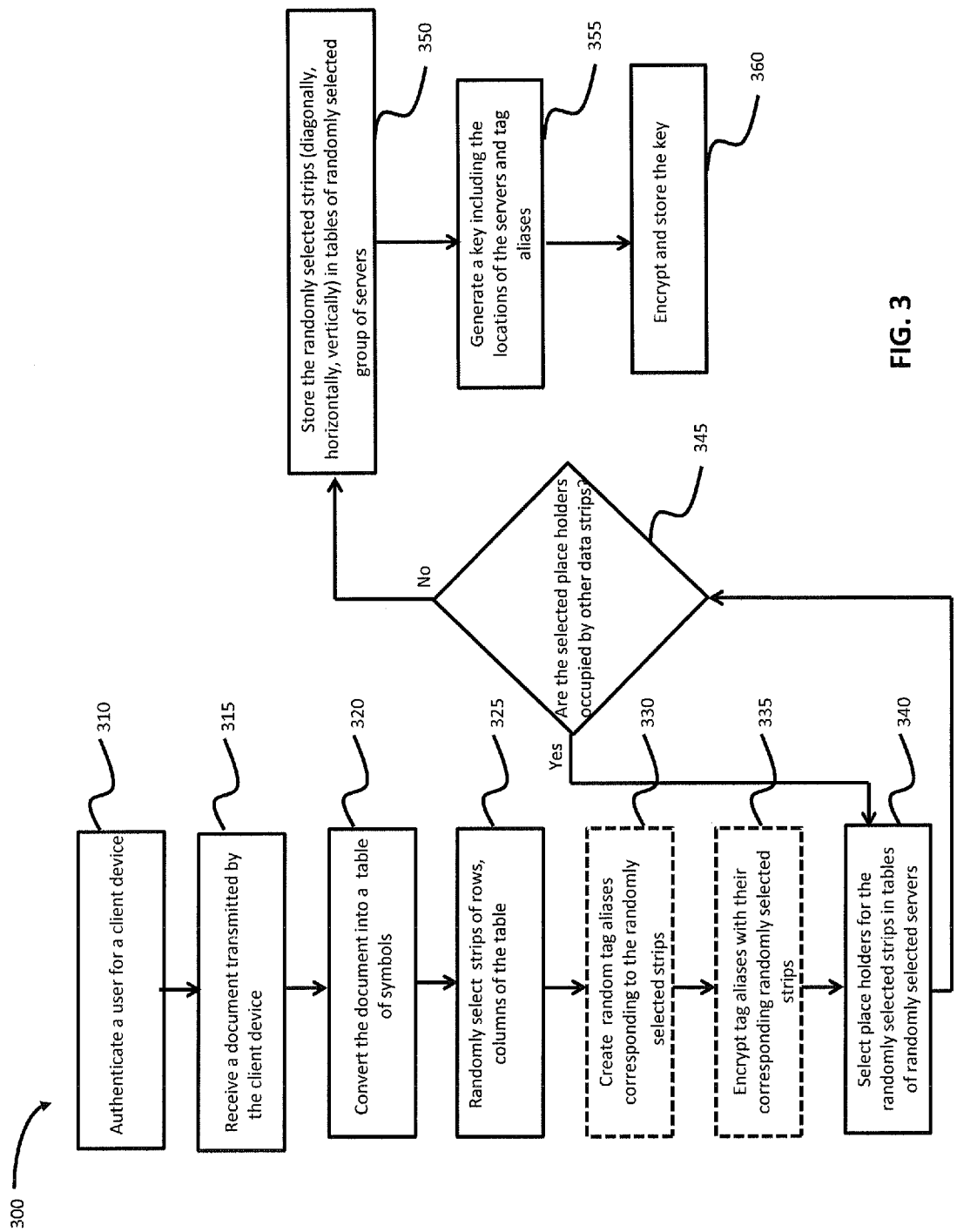
FIG. 3 is a flow-chart diagram of an example process executed by an enterprise server to store a document according to one or more implementations described herein.

FIG. 3 is a flow chart of an example process 300 that runs on enterprise server 150 according to one or more implementations described herein. In these implementations, process 300 may be performed by one or more components of enterprise server 150 (e.g., the administration tool). In other implementations, one or more blocks of process 300 may be performed by one or more other components/devices, or a group of components/devices, including the enterprise server 150.

In this example, the enterprise server 150 may implement administration tool 151 to facilitate the storage of a document that is received from client device 110.

As described above, a document may include, but not be limited to, any variety or combination of text files, spreadsheet files, presentation files, portable document files, audio files, video files, programming files, etc. It is contemplated that, implementations of various techniques for authentication, encryption and/or shredding may be based on the type of file or portions of the file that have different types. For example, a document file that contains portions with both sensitive and public information may be encrypted differently for the two different portions of the file.

At block 310, the enterprise server 150 may authenticate a user of the UE device. The authentication may be performed based on a user identification provided by the user. The user identification information may include a log in name and a password of the user or biometric information such as fingerprint, iris scan or retinal scan. In one example, the authentication may be performed based on identification information of the UE device 110. This may include an Internet Protocol (IP) address of the UE device, a device identification number or any other identification information related to the UE device 110. In another example, the authentication may be performed based on a combination of the user identification and UE device identification information. In one example, the type of authentication may be specified by a user of the UE device, or alternatively, assigned by the enterprise server when the user initiates the storage process for the document. In one implementation, the type of authentication may be based on a type of document that is being processed for storage. For example, a combination of username and password may be used or required for authentication during storage process of a music file. In another example, a retinal scan may be used or required for authentication during storage process of a document that contains sensitive information. It is further contemplated that a random assignment (e.g., by the enterprise server) of a type authentication based on the type of document may increase the security level of the authentication process. This is because the user providing the authentication information will have no knowledge of the type of authentication that needs to be provided, prior to the authentication process. Upon receiving the authentication information, the authentication module 155 of the enterprise server 150 performs the authentication process. The authentication process may include verifying the authentication information by consulting a database (not shown), local to the enterprise server 150. In this example, the database stores information related to the authorized UE devices and users. Alternatively, the authentication module of the enterprise server 150, upon receiving the authentication information, may consult an outside server (e.g., AAA server 160) to verify the authentication information. Upon verification, the enterprise server 150 authorizes either the UE device or the user, or both, to have access to the enterprise server. However, if the enterprise server 150 fails to authorize either the user or the UE device 110 based on the received authentication information, it may halt any further access (either temporarily or permanently).

Upon authentication and verification of the UE device, the enterprise server 150 receives a document that is transmitted by the UE device 110. The received document, in one example, may be temporarily stored in the memory (not shown) of the enterprise server 150. Details of the reception of the document are described above.

At block 320, upon receiving the document from the authorized UE device, administration tool 151 converts the document into a symbol table. In one example, the symbols are binary bits and the resulting binary table may be in a format that is computer-readable but not directly human-readable.

At block 325, the shredder module 159 of the enterprise server 150 may shred the symbol table into random strips of symbol data. In one example, the administration tool 151 may employ a random sequencer (not shown) to shred the document. The shredding of the symbol table may include random selection of different strips of symbol data (i.e., different sections, rows, columns, of the table). In one example, a horizontal row of the symbol table may be chosen as a random strip of symbol data. In another example, a vertical column of the symbol table may be chosen as a random strip of symbol data. Yet in another example, a diagonal section of the symbol table may be chosen as a random strip of symbol data. In one example, the shredding of the symbol table may be based on a type of document. In one implementation, a vertical column of the symbol may be chosen for a music file. In another implementation, for a document file with sensitive information, a random strip of symbol data may include multiple rows, columns and diagonal sections of the symbol table that are simultaneously chosen. In another example, the shredder may be pre-programmed by a network administrator for the selection of the type of shredding based on the type of the document.

In addition, the administration tool 151 may be further configured to identify the sequence of a randomly chosen strip of symbol data in the symbol table. In one example, as shown for strip 513 of FIG. 5A and by placeholder 533 of FIG. 5C, a sequence (i.e., diagonal section covering A1 to C3) may include binary data (e.g. 3 bits).

Optionally, at block 330, the administration tool 151 may be further configured to tag the random strips of symbol data. The administration tool generates tag aliases for the tagged random strips of data. In one example, as shown in FIG. 5A, strip of binary data 513 may be tagged by the administration tool and a random tag alias 514 generated by the administration tool 151 for the strip of binary data 513. In another example, the administration tool may tag a corresponding location of one of the database servers for binary data 513. It is also contemplated that the tag aliases may be stored in the enterprise server separately from the key (see FIG. 5B). For example, as shown in table 520 of FIG. 5B, tag alias 523 may be incorporated with the data strip 513.

Optionally, at block 335, the generated tag aliases may be encrypted by the administration tool 151. The encrypting/decrypting module 153 of the administration tool 151 may encrypt the tag aliases 503 and the tags of table 520. The tagged alias values may also include the location (i.e., the location in one of the database servers) for the data strip. It is contemplated, that the data strip 513 may be encrypted by the encrypting/decrypting module 153 using the binary data in the sequence and the location of the data strip 513 (i.e., without the tag alias).

At block 340, the administration tool may randomly select multiple servers to store the random strips of data. The administration tool 151 may implement a random sequencer that randomly selects the servers and data storage locations within the selected servers. In one example, the selection of the servers may be based on the internet protocol (IP) addresses of the servers (e.g., see column 505 of FIG. 5A).

Upon randomly selecting the servers, the administration tool may then select place holders in the selected servers for storing the strips of data.

At block 345, the administration tool 151 further determines whether the selected place holders overlap or otherwise conflict any other data strips. In one implementation, the administration tool may match or search for an empty place holder corresponding to the data strip.

At block 350, upon determining that a selected place holder is available, the administration tool 151 then stores a strip of symbol data that matches the place holder. The storage of the data strips may be performed diagonally, vertically or horizontally, for example.

For example, as shown in FIG. 5C, database 530 stores the data strip 513 (see FIG. 5A) in the place holder 533 which has a sequence of A1 to C3. The database server in which the data strip 513 is stored has an IP address 152.999.866.10 (see column 505 of FIG. 5A).

If, however, the administration tool determines that there is no available place holder on the selected server, the method goes back to block 340, to select another database server or another database that has an available place holder.

At block 355, the administration tool 151, generates a mapping key based on the location of the servers and the place holders. Optionally, the key may also include the tag aliases of the strips of the symbol data. The key may further include the number of digits in the strip. An example key 161 is shown in FIG. 5A.

At block, 360, the administration tool 151 may invoke the encrypting/decrypting module 153 to encrypt the mapping key generated at block 355. Examples of a key and the encrypted version, encrypted using the substitute cipher table shown in FIG. 6A, are shown in FIGS. 6B and 6C, respectively. As shown in the FIGS. 6B and 6C, the encrypted key 681 corresponds to the sample key 661. The encrypted key is then stored in the enterprise server. In one example, the type of encryption/decryption may be specified by a user of the UE device, or alternatively, assigned by the enterprise server when the user initiates the storage process for the document. In one implementation, the type of encryption may be based on a type of document that is being processed for storage. For example, a DES cipher may be used or required for encryption of a mapping key that is related to a document file (e.g., document that has sensitive information). In another example, a substitute cipher may be used or required for the encryption of the mapping key during the storage process of a music file.

Figure 4:
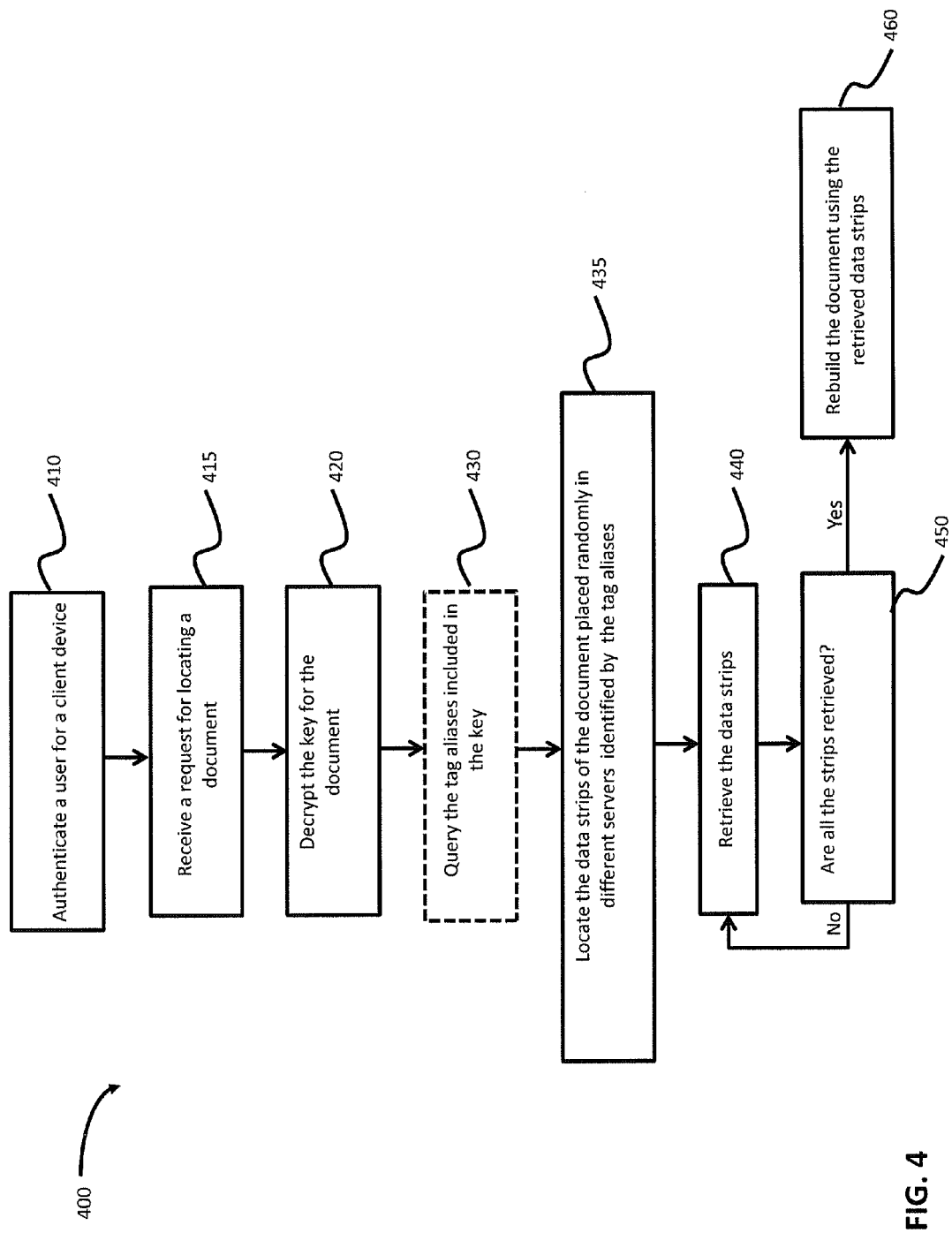
FIG. 4 is a flow-chart diagram of details of another example process executed by the enterprise server to retrieve a document according to one or more implementations described herein.

FIG. 4 is a flow chart of an example process 400 that runs on enterprise server 150 according to one or more implementations described herein. Process 400 may be performed by one or more components of enterprise server 150 (e.g., the administration tool). In other implementations, one or more blocks of process 400 may be performed by one or more other components/devices, or a group of components/devices, including or enterprise server 150.

At block 410, the administration tool authenticates a user of the UE device 110. The authentication process is the same as described in FIG. 3 (block 310). Hence, for the purpose of brevity, the description is omitted here.

At block 415, upon performing an authentication of the user and the UE device, the administration tool 151 receives a request to retrieve a document. In one example, the request may include a unique identifier of the document.

Alternatively, the administration tool may utilize the user and UE device identification, provided during the authentication to initiate the retrieval process. In such an example, the enterprise server 151 may query a database (within the enterprise server or outside the enterprise server) that stores information related to stored documents and their corresponding users. In such a case, the enterprise server may provide an option to the requesting user as to which document the user would like to retrieve. In another example, the administration tool 151 may receive multiple retrieval requests from different users for the same document. The administration tool 151 may then implement a priority rule for the requesting users to provide the document to the respective requesting users. The priority rules for the users may be set by the network administrator and may allow the users to access the document on a first come first serve basis. In another example, the priority rule may set a priority access of one user over another user for accessing the document. It is contemplated that a similar priority rule may be implemented during the storage of the document.

At block 420, the administration tool 151, upon receiving the request for the document, locates an encrypted key corresponding to the requested document. In one example, the administration tool 151 may locate the encrypted key based on the unique identifier (related to the document) received in the request. The unique identifier may be generated and provider to the user during the encryption and storage process. For example, administration tool may search the memory of the enterprise server for the encrypted key. In another example, the administration tool may query databases (not shown) in the enterprise server to locate the encrypted key. Upon locating the encrypted key for the requested document, the administration tool may initiate decryption of the encrypted key. In one example, the decryption may be performed by invoking the encrypting/decrypting module 153 of the administration tool. The administration tool 151 may use a particular encryption method for all documents or may change the encryption based on the type of document or based on the identity of the UE device.

Optionally, at block 430, the administration tool 151 may query the tag aliases, stored separately from the key (e.g., table 520).

Upon decrypting the key, the administration tool 151 may perform a location search for the random strips of symbol data of the corresponding document. For example, the administration tool 151 may use the decrypted key 161 to identify the locations 505 of the different servers storing the random strips of symbol data (column 501). The locations, in one example, may include the IP addresses of the servers (column 505). Additionally, the administration tool may further locate the random strips of data by identifying the servers and the sequences (see columns 507 and 511) of the random strips of symbol data. These sequences may include respective pointers to the first and last symbols in the memory of the identified server or a pointer into a database record of a database stored on the server. In another example, the administration tool 151 may identify the corresponding decrypted tag aliases of the random strips of data to locate the strips.

At block 440, the administration tool 151 retrieves the located random strips of data stored in the different database servers. The retrieval process may include fetching the data strips by querying the corresponding locations and the sequences of the data strips as indicated in the mapping key. Alternatively, the administration tool may fetch the data strips by querying a further database of tag aliases that already include the location and the sequences of the random strips of data.

At block 450, the administration tool may determine whether all of the data strips corresponding to the document have been retrieved. For example, the administration tool may consult the mapping key to determine if the number of retrieved strips equals the number of strips indicated in the mapping key.

If, however, all of the data strips are not recovered, the process goes back to block 440. At block 460, upon retrieval of all of the data strips, the administration tool invokes the document rebuilder module 157 to rebuild the document. Upon successful recovery, the document is then rebuilt in the enterprise server and a notification message is sent to the UE device 110 notifying it of the availability of the requested document.

It is noted that example programs shown in FIGS. 3 and 4 may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
  receiving a document by an enterprise server;
  converting, by the enterprise server, the document into a table of symbols;
  dividing, by the enterprise server, the table of symbols into a plurality of randomly selected segments of symbols from among horizontal segments of symbols, vertical segments of symbols, and diagonal segments of symbols provided in the table of symbols;
  randomly selecting, by the enterprise server, a plurality of storage locations in at least one database server;
  storing, by the enterprise server, the plurality of randomly selected segments of symbols in the plurality of storage locations of the at least one database server;
  generating, by the enterprise server, a key based on the plurality of randomly selected segments of symbols and based on the plurality of storage locations, the key including pointers to the plurality of storage locations; and encrypting, by the enterprise server, the generated key.

2. The method of claim 1, wherein the encrypting the generated key is based on a type of the document.

3. The method of claim 1, wherein the randomly selecting the plurality of storage locations includes:
selecting a plurality of place holders,
each place holder, of the plurality of place holders, indicating a storage medium of one database server of the at least one database server,
wherein the place holder includes respective pointers to beginning and ending storage locations in the storage medium.

4. The method of claim 3, wherein the selecting the plurality of place holders includes:
determining whether each of the selected plurality of place holders conflicts with a previously stored segment of symbols, and
upon determining that one place holder, of the selected plurality of place holders, does not conflict, storing at least one of the plurality of randomly selected segments of symbols in a storage location associated with the one selected place holder.

5. The method of claim 3, wherein the randomly selecting the plurality of storage locations includes:
for each place holder, randomly identifying the at least one database server, from among a plurality of database servers, corresponding to a respective plurality of Internet Protocol addresses.

6. The method of claim 1, wherein the generating the key includes:
tagging the plurality of randomly selected segments of symbols and the plurality of storage locations, and
generating a plurality of tag aliases corresponding to the tagged plurality of randomly selected segments of symbols and the plurality of storage locations.

7. The method of claim 6, further including:
encrypting the generated plurality of tag aliases.

8. The method of claim 1, further including:
receiving authentication data from a user, and
authenticating the user prior to receiving the document.

9. An enterprise server, comprising:
a memory to store instructions; and
a processor, to execute the instructions in the memory, to:
receive a document;
convert the document into a table of symbols;
divide the table into a plurality of randomly selected segments of symbols from among horizontal segments of symbols, vertical segments of symbols, and diagonal segments of symbols in the table of symbols;
randomly select a plurality of storage locations in at least one database server;
store the plurality of randomly selected segments of symbols in the plurality of storage locations of the at least one database server;
generate a key based on the plurality of randomly selected segments of symbols and based on the plurality of storage locations,
the key including pointers to the plurality of storage locations; and encrypt the generated key.

10. The enterprise server of claim 9, wherein, when encrypting the generated key, the processor is to:
encrypt the generated key based on a type of document that is being received.

11. The enterprise server of claim 9, wherein the processor is further to:
select a plurality of place holders,
each place holder, of the plurality of place holders, indicating a storage medium of one database server of the at least one database server,
wherein the place holder includes respective pointers to beginning and ending storage locations in the storage medium.

12. The enterprise server of claim 11, wherein, when selecting the plurality of place holders, the processor is to:
determine whether each of the selected plurality of place holders conflicts with a previously stored segment of symbols, and
upon determining that one place holder, of the selected plurality of place holders, does not conflict, store at least one of the plurality of randomly selected symbols in a storage location associated with the one selected place holder.

13. The enterprise server of claim 11, wherein, when randomly selecting the plurality of storage locations, the processor is to:
for each place holder, randomly identify the one database server from among a plurality of database servers that correspond to a respective plurality of Internet Protocol addresses.

14. The enterprise server of claim 9, wherein, when generating the key, the processor is to:
tag the plurality of randomly selected segments of symbols and the plurality of storage locations, and
generate a plurality of tag aliases corresponding to the tagged plurality of randomly selected segments of symbols and the plurality of storage locations.

15. The enterprise server of claim 14, wherein, when generating the key, the processor is to:
encrypt the generated plurality of tag aliases.

16. The enterprise server of claim 9, wherein the processor is further to:
receive authentication data from a user, and
authenticate the user before receiving the document.

17. A method comprising:
authenticating, by an enterprise server, a user equipment (UE) device upon receiving authentication information related to the UE device;
receiving, by the enterprise server, a request for a document from the UE device;
upon receiving the request, locating, by the enterprise server an encrypted key related to the document;
decrypting, by the enterprise server, the encrypted key to obtain a decrypted key;
identifying, by the enterprise server and within the decrypted key, a plurality of locations of a plurality of randomly selected segments of symbols of the requested document,
the plurality of randomly selected segments of symbols being selected by dividing a table of symbols into the plurality of randomly selected segments of symbols from among horizontal segments of symbols, vertical segments of symbols, and diagonal segments of symbols provided in the table of symbols;
retrieving, by the enterprise server, the plurality of randomly selected segments of symbols from the plurality of locations; and
rebuilding, by the enterprise server, the requested document from the retrieved plurality of randomly selected segments of symbols using an order derived from the decrypted key.

18. The method of claim 17, wherein the identifying the plurality of locations includes:
identifying a plurality of database servers according to the identified plurality of locations corresponding to a plurality of Internet Protocol addresses in the decrypted key.

19. The method of claim 17, further including:
identifying a plurality of tag aliases corresponding to the identified plurality of locations.

20. The method of claim 19, wherein the retrieving the plurality of randomly selected segments of symbols includes:
querying a plurality of database servers using the plurality of tag aliases.

* * * * *